(12) United States Patent
Oveyssi

(10) Patent No.: US 6,801,404 B1
(45) Date of Patent: Oct. 5, 2004

(54) DISK DRIVE INCLUDING A ROTARY ACTUATOR WITH THERMO-CONDUCTIVE COIL SUPPORT ELEMENT AND COIL

(75) Inventor: Kamran Oveyssi, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 147 days.

(21) Appl. No.: 10/232,632

(22) Filed: Aug. 30, 2002

(51) Int. Cl.$^7$ .......................... G11B 33/14; G11B 5/55
(52) U.S. Cl. ................................................ 360/265.8
(58) Field of Search ................. 360/97.02, 97.03, 360/265, 265.8, 265.7

(56) References Cited

U.S. PATENT DOCUMENTS

| | | | |
|---|---|---|---|
| 4,879,617 A | * 11/1989 | Sampietro et al. | 360/265 |
| 5,168,185 A | * 12/1992 | Umehara et al. | 310/15 |
| 5,214,552 A | * 5/1993 | Haga | 360/264.7 |
| 6,078,477 A | 6/2000 | Adams et al. | 360/97.02 |
| 6,181,530 B1 | 1/2001 | Ratliff et al. | 360/265.8 |
| 6,600,633 B2 | * 7/2003 | Macpherson et al. | 360/265.8 |

* cited by examiner

*Primary Examiner*—Jefferson Evans
(74) *Attorney, Agent, or Firm*—Won Tae C. Kim, Esq.; Milad G. Shara, Esq.; Stetina Brunda Garred & Brucker

(57) ABSTRACT

A disk drive includes a disk drive base and a rotary actuator coupled to the disk drive base. The rotary actuator includes an actuator body including a bore defining a longitudinal axis. The rotary actuator further includes a coil portion including a coil and a support element for supporting the coil. The coil support element is integrally formed with the actuator body and radially extends from the actuator body. The coil support element has a coil supporting surface generally perpendicular to the longitudinal axis. The coil is attached to the coil supporting surface. The coil support element is sized and configured to support the coil and formed of a thermo-conductive material for dissipating heat from the coil.

14 Claims, 2 Drawing Sheets

DISK DRIVE INCLUDING A ROTARY ACTUATOR WITH THERMO-CONDUCTIVE COIL SUPPORT ELEMENT AND COIL

BACKGROUND OF THE INVENTION

Cross-Reference to Related Applications

Not applicable.

1. Field of the Invention

The present invention relates generally to disk drives, and in particular to a disk drive having a rotary actuator with a thermo-conductive coil support element.

2. Description of the Prior Art

The typical hard disk drive includes a head disk assembly (HDA) and a printed circuit board assembly (PCBA) attached to a disk drive base of the HDA. The head disk assembly includes the disk drive base, a cover, at least one magnetic disk, a spindle motor for rotating the disk, and a head stack assembly (HSA).

The spindle motor includes a spindle motor hub that is rotatably attached to the disk drive base. The spindle motor hub has an outer hub flange that supports a lowermost one of the disks. Additional disks may be stacked and separated with annular disk spacers that are disposed about the spindle motor hub. The head stack assembly has an actuator assembly including at least one air bearing slider or head, typically several, for reading and writing data from and to the disk. The printed circuit board assembly includes a servo control system in the form of a disk controller for generating servo control signals. The head stack assembly is controllably positioned in response to the generated servo control signals from the disk controller. In so doing, the attached sliders are moved relative to tracks disposed upon the disk.

The head stack assembly includes the actuator assembly, at least one head gimbal assembly (HGA), and a flex circuit cable assembly that are attached to the actuator assembly. A conventional "rotary" or "swing-type" actuator assembly typically comprises an actuator body, a pivot bearing cartridge, one or more actuator arms that extend from one side of the actuator body, and a coil portion that extends from an opposite side of the actuator body. The actuator body includes a bore and the pivot bearing cartridge engaged within the bore for allowing the actuator body to rotate between limited positions. The coil portion includes a coil that is configured to interact with one or more permanent magnets to form a voice coil motor.

At least one head gimbal assembly is distally attached to each of the actuator arms. A head gimbal assembly includes an air bearing slider that is attached to a suspension with a gimbal. The suspension resiliently supports the slider above the tracks of the disk during operation of the disk drive facilitating the slider to "fly" above the disk. The head gimbal assemblies and the flex circuit cable assembly are attached to the actuator assembly. The voice coil motor is configured to allow the actuator assembly to be controllably rotated or pivoted so as to move the sliders relative to the disks for reading and writing operations with respect to the tracks contained on the disks. The printed circuit board assembly is disposed in electrical communication with the coil via the flex circuit cable assembly for providing a control current to energize the coil to create an electromagnetic field that interacts with the permanent magnets to controllably position the actuator assembly.

A topic of concern is to reduce read/write access time (the time required to position the transducer head from an operable position adjacent a particular track to another track to perform read/write operations). A low read/write access time may be achieved by increasing the strength of the magnetic field of the voice coil motor and having a high level of current applied to the coil (to produce high torque). A high level of current through the coil, however, results in a relatively higher power consumption. If heat produced in the coil is not dissipated at a rapid enough rate, then the coil temperature increases which in turn increases the coil resistance. This in turn counterproductively reduces the coil current increasing the access time. Moreover, elevated coil temperatures may result in damage to the coil and adjacent components. An additional topic of concern is the desire to reduce the overall disk drive size, and in particular the reduction of the height of the disk drive. In this regard, there is a need in the art for an improved actuator assembly design that takes into consideration vertical height limitations and provides thermal heat transfer from the coil of the voice coil motor, so as to reduce the accumulation of heat energy in the coil to reduce the coil operating temperature.

SUMMARY OF THE INVENTION

An aspect of the present invention can be regarded as a disk drive that includes a disk drive base and a rotary actuator coupled to the disk drive base. The rotary actuator includes an actuator body including a bore defining a longitudinal axis. The rotary actuator further includes a coil portion including a coil and a coil support element for supporting the coil. The coil support element is integrally formed with the actuator body and radially extends from the actuator body. The support element has a coil supporting surface generally perpendicular to the longitudinal axis. The coil is attached to the coil supporting surface. The coil support element is sized and configured to support the coil and formed of a thermo-conductive material for dissipating heat from the coil.

According to various embodiments, the coil support element may include an opening formed through the coil support element and the coil is disposed about the opening. The coil support element may be generally planar. The coil may be attached to the coil support element with adhesive. The coil support element and the actuator body may be formed of a metal material, such as aluminum. The rotary actuator may further include an actuator arm radially extending from the actuator body opposite the coil portion, and the actuator arm may be integrally formed with the coil support element.

According to another aspect of the present invention, there is provided the head stack assembly including the rotary actuator as described above.

DESCRIPTION OF THE PREFERRED EMBODIMENTS

Figure 1:
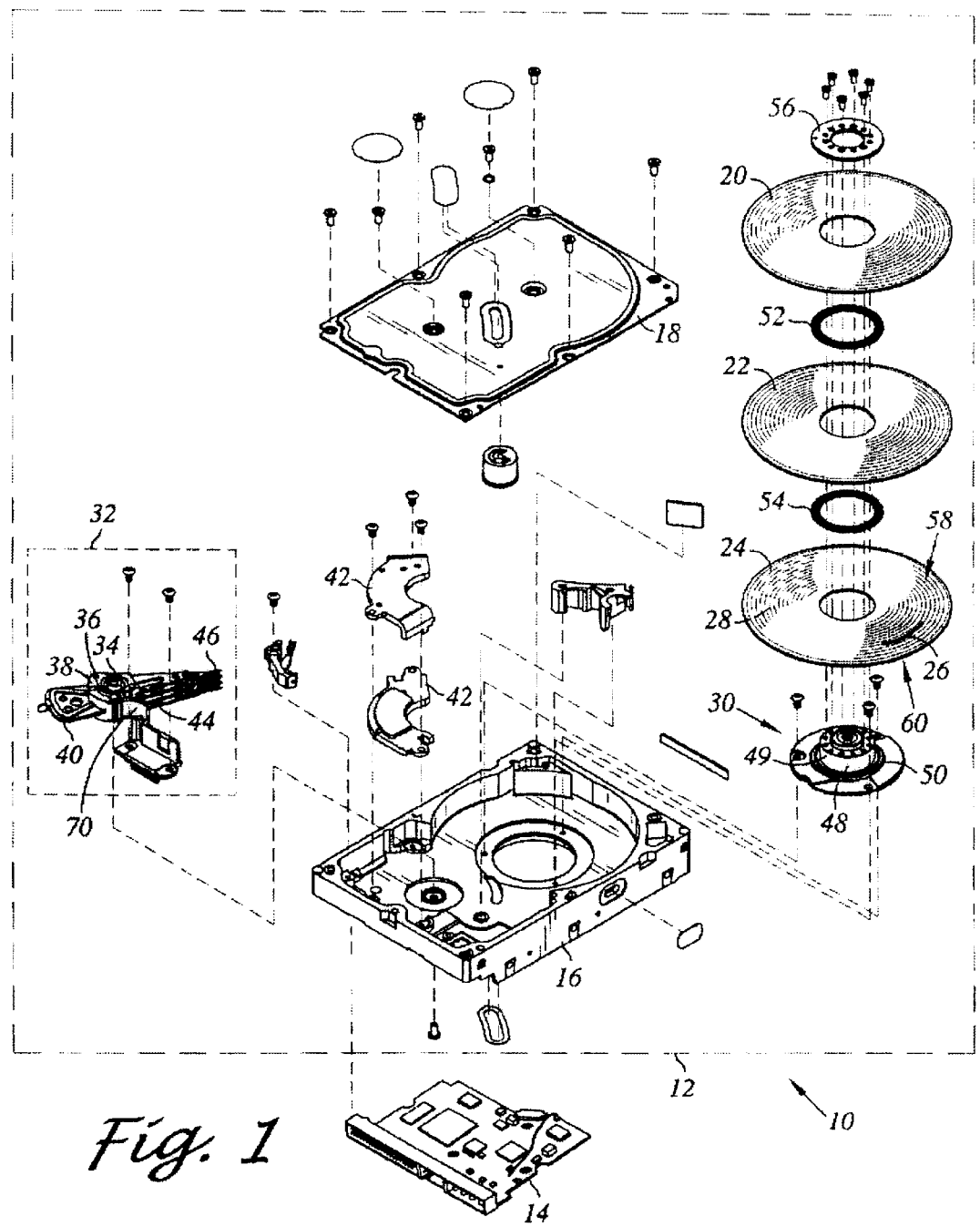
FIG. 1 is an exploded perspective view of a disk drive including a rotary actuator as constructed in accordance with the present invention.
Figure 2:
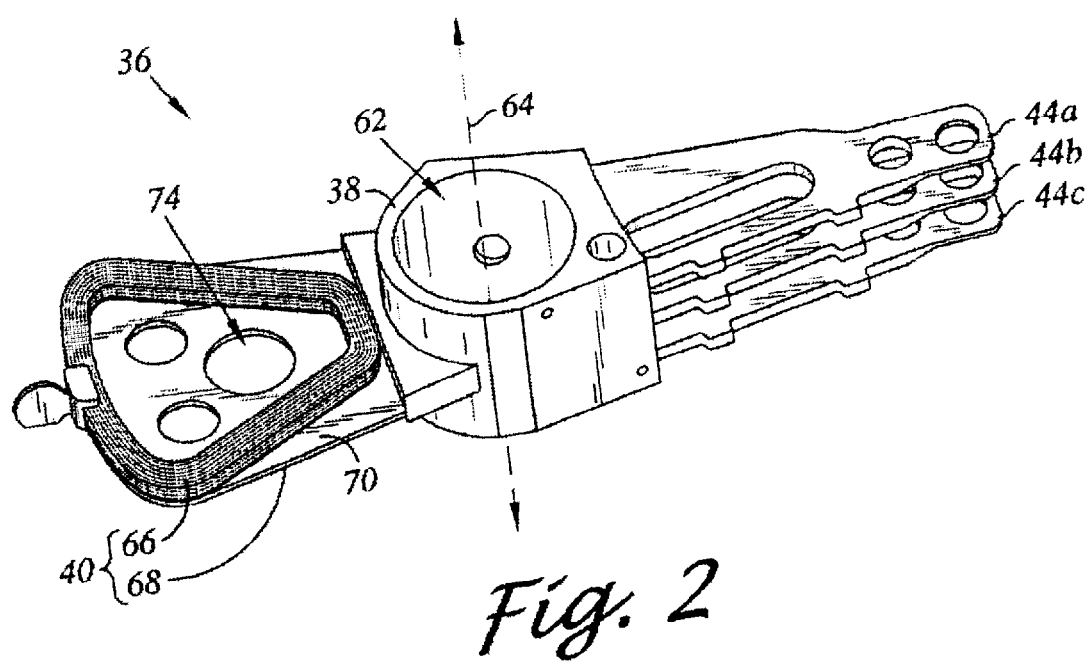
FIG. 2 is an enlarged view of the rotary actuator as constructed in accordance with the present invention.

Referring now to the drawings wherein the showings are for purposes of illustrating preferred embodiments of the present invention only, and not for purposes of limiting the same, FIGS. 1 and 2 illustrate a disk drive including a rotary actuator in accordance with the aspects of the present invention.

Referring now to FIG. 1 there is depicted an exploded perspective view of a disk drive 10 constructed in accordance with an aspect of the present invention. In the embodiment shown, the disk drive 10 includes a head disk assembly (HDA) 12 and a printed circuit board assembly (PCBA) 14. The head disk assembly 12 includes a housing which may include a disk drive base 16 and a cover 18 that collectively house magnetic disks 20, 22, 24. Each magnetic disk 20, 22, 24 contains a plurality of tracks for storing data. The magnetic disks 20, 22, 24 may be two-sided, and thus for example, the magnetic disk 24 is shown having a track 26 on an upper facing side 58 and a track 28 (shown in phantom) on a lower facing side 60. The head disk assembly 12 further includes a spindle motor 30 for rotating the magnetic disks 20, 22, 24. The head disk assembly 12 further includes a head stack assembly 32 and a pivot bearing cartridge 34. The head stack assembly 32 includes a rotary actuator 36.

The rotary actuator 36 includes an actuator body 38 that has a bore 62 (as shown in FIG. 2) and the pivot bearing cartridge 34 engaged within the bore 62 for facilitating the rotary actuator 36 to rotate between limited positions. The rotary actuator 36 further includes a coil portion 40 that extends from one side of the actuator body 38 to interact with a pair of permanent magnets 42 to form a voice coil motor for pivoting the rotary actuator 36. A plurality of actuator arms, the lowermost one of which being denoted 44, extend from an opposite side of the actuator body 38. As the disks 20, 22, 24 may be two sided, each of the actuator arms include either one or two head gimbal assemblies associated with the adjacent sides of the disks 20, 22, 24. Each head gimbal assembly includes an air bearing slider or slider (the uppermost one being denoted 46). Each air bearing slider 46 is contemplated to include a transducer head for reading and writing data to and from the disks 20, 22, 24.

The spindle motor 30 includes a spindle motor hub 48 that is rotatably attached to the disk drive base 16. The spindle motor hub 48 has a hub body 49 and a hub flange 50 that extends from the hub body 49. The hub flange 50 includes a supporting surface for supporting a lowermost one of the disks, namely disk 24. The remaining disks 22, 20 are stacked and separated with annular disk spacers 52, 54 that are disposed about the hub body 49. A disk clamp 56 is attached about the spindle motor hub 48 and is utilized to apply a clamping force against the topmost disk 20 for securing all the disks 20, 22, 24 to the spindle motor hub 48.

Referring now additionally to FIG. 2, an aspect of the present invention can be regarded as the disk drive 10 that includes the disk drive base 16 and the rotary actuator 36 coupled to the disk drive base 16. The actuator 36 includes the actuator body 38 that includes the bore 62 defining a longitudinal axis 64. The actuator 36 further includes the coil portion 40 including a coil 66 and a support element 68 for supporting the coil 66. The coil support element 68 is integrally formed with the actuator body 38 and radially extends from the actuator body 38. The coil support element 68 has a coil supporting surface 70 generally perpendicular to the longitudinal axis 64. The coil 66 is attached to the coil supporting surface 70. The coil support element 68 is sized and configured to support the coil 66 and formed of a thermo-conductive material for dissipating heat from the coil 66.

It is contemplated that the printed circuit board assembly 14 is disposed in electrical communication with the coil 66 via a flex circuit cable assembly 70 for providing a control current to energize the coil 66 to crate an electromagnetic field that interacts with the permanent magnets 42 to controllably position the rotary actuator 36.

As mentioned above, the coil support element 68 is particularly formed of a thermo-conductive material for dissipating heat from the coil 66. In this regard, the coil support element 68 may be formed of a metal material, such as aluminum. Other suitable materials may include thermo-conductive plastics for example. Because the coil support element 68 is integrally formed with the actuator body 38, heat conducted from the coil 66 to the coil support element 68 is dissipated to the actuator body 38. Moreover, because the coil support element 68 is formed to have a coil supporting surface 70 generally perpendicular to the longitudinal axis 64, it is contemplated that such a design allows for a significant amount of surface area for interfacing with the coil 66. This not only allows for efficient heat transfer between the coil 66 and the coil support element 68, but also lends itself to a relatively thin profile with respect to the vertical dimension. In this regard, the coil support element 68 is contemplated to be an efficient heat sink. Additionally, because of this design allow for the coil 66 to be laid out in a flat configuration, the coil 66 may have a relatively large exposed surface area for also dissipating heat by way of convection.

Like the coil support element 68, the actuator body 38 may be formed of a metal material, such as aluminum. Other suitable materials may include thermo-conductive plastics for example. The coil support element 68 and the actuator body 38 may be formed from a continuous piece of material. In addition the rotary actuator 38 may further include an actuator arm, such as those individually denoted 44a–c in FIG. 2, radially extending from the actuator body 38 opposite the coil portion 40. The actuator arms 44a–c may be integrally formed with the coil support element 68. In this regard, the coil support element 68, the actuator body 38 and the actuator arms 44a–c may all be formed of a continuous piece of material. This not only is contemplated to further enhance the heat dissipative nature of the rotary actuator 36 but also result in efficiencies with regard to number of parts and fabrication of the same.

The coil support element 68 may be generally planar. The coil support element 68 may be non-planar such as being finned for purposes of increasing the surface area of the coil supporting surface 70 for example. It is contemplated that the coil support element 68 has a suitable thickness so as to structurally support the coil 66 in a cantilever fashion such as shown. The coil 66 may be attached to the coil support element 68 with adhesive, although other methods of attachment may be utilized. The support element may include an opening 74 formed through the coil support element 68 and the coil is disposed about the opening 74.

I claim:

1. A disk drive comprising:

a disk drive base;

a rotary actuator coupled to the disk drive base, the rotary actuator comprising:

an actuator body including a bore defining a longitudinal axis the actuator body being formed of a metal material; and a coil portion including a coil and a coil support element for supporting the coil, the coil support element being formed of a metal material, the coil support element integrally formed with the actuator body and radially extending from the actuator body, the coil support element having a coil supporting surface generally perpendicular to the longitudinal axis, the coil being attached to the coil supporting surface, the coil support element being sized and configured to support the coil and formed of a thermo-conductive material for dissipating heat from the coil.

2. The disk drive of claim 1 wherein the coil support element includes an opening formed through the coil support element, the coil is disposed about the opening.

3. The disk drive of claim 1 wherein the coil support element is generally planar.

4. The disk drive of claim 1 wherein the coil is attached to the coil support element with adhesive.

5. The disk drive of claim 1 wherein the coil support element is formed of aluminum.

6. The disk drive of claim 1 wherein the actuator body is formed of aluminum.

7. The disk drive of claim 1 wherein the rotary actuator further includes an actuator arm radially extending from the actuator body opposite the coil portion, the actuator arm is integrally formed with the coil support element.

8. A head stack assembly for use in a disk drive, the head stack assembly comprising:

a rotary actuator including:

an actuator body including a bore defining a longitudinal axis, the actuator body being formed of a metal material; and a coil portion including a coil and a coil support element for supporting the coil, the coil support element being formed of a metal material, the coil support element integrally formed with the actuator body and radially extending from the actuator body, the coil support element having a coil supporting surface generally perpendicular to the longitudinal axis, the coil being attached to the coil supporting surface, the coil support element being sized and configured to support the coil and formed of a thermo-conductive material for dissipating heat from the coil.

9. The head stack assembly of claim 8 wherein the coil support element includes an opening formed through the coil support element, the coil is disposed about the opening.

10. The head stack assembly of claim 8 wherein the coil support element is generally planar.

11. The head stack assembly of claim 8 wherein the coil is attached to the coil support element with adhesive.

12. The head stack assembly of claim 8 wherein the coil support element is formed of aluminum.

13. The head stack assembly of claim 8 wherein the actuator body is formed of aluminum.

14. The head stack assembly of claim 8 wherein the rotary actuator further includes an actuator arm radially extending from the actuator body opposite the coil portion, the actuator arm is integrally formed with the coil support element.

* * * * *